United States Patent
Douglas et al.

(10) Patent No.: US 11,033,905 B2
(45) Date of Patent: Jun. 15, 2021

(54) REAGENT CARTRIDGE

(71) Applicant: Fluidic Analytics Limited, Cambridge (GB)

(72) Inventors: Anthony Douglas, Cambridge (GB); Tuomas Pertti Jonathan Knowles, Cambridge (GB); Thomas Mueller, Oberengstringen (CH); Liam Dower, Cambridge (GB); Sean Devenish, Cambridge (GB)

(73) Assignee: Fluidic Analytics Limited, Cambridge (GB)

( * ) Notice: Subject to any disclaimer, the term of this patent is extended or adjusted under 35 U.S.C. 154(b) by 251 days.

(21) Appl. No.: 16/330,119

(22) PCT Filed: Sep. 11, 2017

(86) PCT No.: PCT/GB2017/052649
§ 371 (c)(1),
(2) Date: Mar. 4, 2019

(87) PCT Pub. No.: WO2018/046953
PCT Pub. Date: Mar. 15, 2018

(65) Prior Publication Data
US 2019/0201903 A1  Jul. 4, 2019

(30) Foreign Application Priority Data
Sep. 12, 2016  (GB) ..................... 1615472

(51) Int. Cl.
*B01L 3/00* (2006.01)
*G01N 35/10* (2006.01)

(52) U.S. Cl.
CPC ......... *B01L 3/527* (2013.01); *B01L 3/502715* (2013.01); *G01N 35/1002* (2013.01); *B01L 3/505* (2013.01); *B01L 2400/0481* (2013.01)

(58) Field of Classification Search
CPC ....... B01L 2400/0481; B01L 3/502715; B01L 3/505; B01L 3/527; G01N 35/1002
See application file for complete search history.

(56) References Cited

U.S. PATENT DOCUMENTS

| | | |
|---|---|---|
| 4,957,436 A | 9/1990 | Ryder |
| 5,665,315 A | 9/1997 | Robert et al. |

(Continued)

FOREIGN PATENT DOCUMENTS

| | | |
|---|---|---|
| GB | 2538846 A | 11/2016 |
| WO | WO 2008/032030 A2 | 3/2008 |

(Continued)

OTHER PUBLICATIONS

Search Report for App. No. GB 1615472.6 dated Dec. 23, 2016. 7 pages.

(Continued)

*Primary Examiner* — Jennifer Wecker
*Assistant Examiner* — Jonathan Bortoli
(74) *Attorney, Agent, or Firm* — Wolf, Greenfield & Sacks, P.C.

(57) ABSTRACT

A fluidic system is provided. The system comprises: a rigid housing (12), a plurality of flexible reagent containers (14) contained within the housing (12); wherein each reagent container (14) has a connection port (16) through which a reagent can flow, in use, on the application of pressure. The system further comprises a single pressure source (18) configured to apply pressure to the interior of the rigid housing (12); a microfluidic device configured to analyse one or more fluids provided from the plurality of reagent containers; and a plurality of channels (20) configured to transfer fluid from the plurality of reagent containers (14) to the microfluidic device. The ratio of resistances provided by a combination of the connection ports and the plurality of (Continued)

Figure 1:
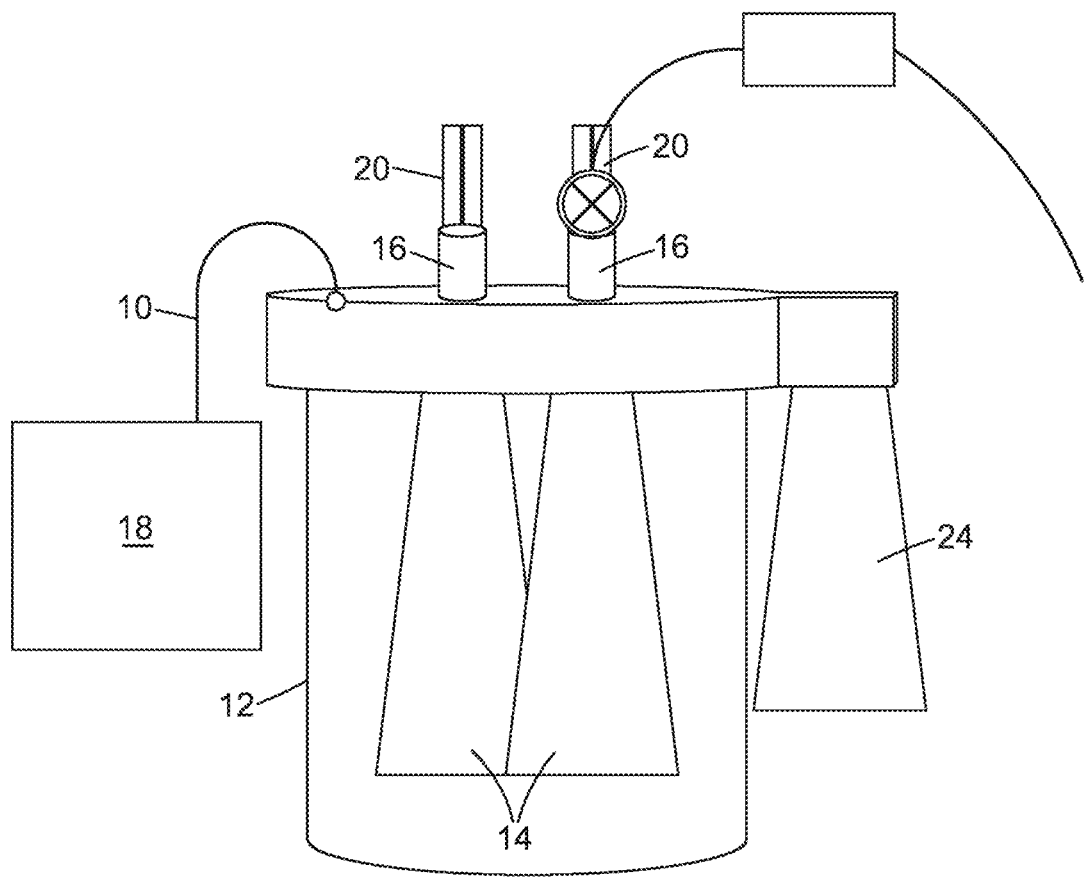

channels dictates the ratio of flow rates of the reagents. The claimed system allows for an accurate control of the various reagent flow rates while minimizing fluctuations in the relative flow rates.

10 Claims, 2 Drawing Sheets

(56) References Cited

U.S. PATENT DOCUMENTS

| | | |
|---|---|---|
| 6,495,366 B1 | 12/2002 | Briggs |
| 6,915,679 B2 | 7/2005 | Chien et al. |
| 7,171,983 B2 | 2/2007 | Chien et al. |
| 7,497,997 B2 | 3/2009 | Glezer et al. |
| 8,153,083 B2 | 4/2012 | Briggs |
| 8,383,039 B2 | 2/2013 | Zhou et al. |
| 8,641,986 B2 | 2/2014 | Glezer et al. |
| 8,986,614 B2 | 3/2015 | Zhou et al. |
| 9,073,028 B2 | 7/2015 | Hovinen et al. |
| 9,328,381 B2 | 5/2016 | Zhou et al. |
| 9,952,222 B2 | 4/2018 | Yates et al. |
| 9,958,369 B2 | 5/2018 | Cohen et al. |
| 2002/0049557 A1 | 4/2002 | Chen |
| 2009/0209898 A1 | 8/2009 | Briggs |
| 2010/0059423 A1 | 3/2010 | Davis et al. |
| 2011/0014095 A1 | 1/2011 | Ueda et al. |
| 2011/0180150 A1 | 7/2011 | Cooksey |
| 2015/0218613 A1 | 8/2015 | De Forest et al. |
| 2015/0360221 A1 | 12/2015 | Schultz et al. |
| 2015/0361488 A1 | 12/2015 | Schultz et al. |
| 2017/0052147 A1 | 2/2017 | Herling et al. |
| 2018/0188145 A1 | 7/2018 | Mueller et al. |
| 2018/0267054 A1 | 9/2018 | Yates et al. |
| 2018/0328831 A1 | 11/2018 | Cohen et al. |

FOREIGN PATENT DOCUMENTS

| | | | |
|---|---|---|---|
| WO | WO-2015195831 A1 * | 12/2015 | .......... B01F 11/0071 |
| WO | WO 2017/141048 A1 | 8/2017 | |
| WO | WO 2017/174975 A1 | 10/2017 | |
| WO | WO 2018/002596 A1 | 1/2018 | |
| WO | WO 2018/042190 A1 | 3/2018 | |
| WO | WO 2018/046952 A1 | 3/2018 | |
| WO | WO 2018/046954 A1 | 3/2018 | |

OTHER PUBLICATIONS

International Search Report and Written Opinion for PCT/GB2017/052649 dated Nov. 9, 2017. 17 pages.

* cited by examiner

REAGENT CARTRIDGE

RELATED APPLICATIONS

This application is a national stage filing under 35 U.S.C. § 371 of international application number PCT/GB2017/052649, filed Sep. 11, 2017, which claims priority to GB application number GB1615472.6, filed Sep. 12, 2016, each of which is herein incorporated by reference in its entirety.

This invention relates to improvements in or relating to a reagent cartridge and in particular, a reagent cartridge that can be used to dictate the flow rates of reagents upon the application of pressure.

A single flexible container contained within a rigid housing can be used to host fluids under high pressure. Fluids that are kept under high pressure are routinely found and used in everyday products such as aerosol cans and carbonated beverages. Additionally, sterile and fermenting products may provide a plurality of flexible containers within the rigid housing. However, the flow rates of the fluids in the containers are not routinely controlled to an accuracy of microlitres per minute or per hour in such products.

In the field of microfluidic systems, pressurizing fluids directly in rigid containers can provide a means for delivering the fluids and/or handling the flow of fluids to the microfluidic device. Microfluidic devices are prominent tools used in applied research and in commercial manufacturing processes. These microfluidic systems are routinely used to analyze, separate, isolate, or purify biological particles, such as DNA, RNA, carbohydrates and proteins.

The flow of fluids directly in rigid containers is typically carried out by directly pressurising the fluids with gases. These gases may dissolve into the fluids which may gas out at a later stage, or it may react (for example, oxidation) with the constituents of the fluids. In some instances, this may result in the unintentional contamination of the fluids.

Furthermore, the flow rates of pressurised fluids in single flexible containers are typically high for example, in the order of $\mu L$-10 mL/s or higher and as a result, the flow rates are not easily controllable on a microliter per minute or hour level. As a consequence, the proportion of fluids that flow from the flexible containers into the microfluidic device can vary substantially.

It is against this background that the invention has arisen.

According to the present invention there is provided, a reagent cartridge comprising: a rigid housing, a plurality of flexible reagent containers contained within the housing; wherein each reagent container has a connection port through which a reagent can flow, in use, on the application of pressure; and a single pressure source configured to apply pressure to the interior of the rigid housing.

The flexibility of the reagent containers is particularly advantageous because it may substantially expand or contract in order to increase or decrease its volume and capacity to hold the reagents. In some embodiments, the capacity of the reagent containers may be substantially equal, so that the proportions of one or more reagents in the containers are equal. Conversely, the capacity of the reagent containers may substantially differ, so that the proportions of one or more reagents in the containers are different.

Providing a plurality of flexible reagent containers within the housing can be advantageous as it provides a means for hosting a plurality of different reagents that can be actuated simultaneously by a single pressure source. In some embodiments, the reagent can be a fluid. The fluid can be either a liquid or a gas.

The cartridge reagent of the present invention may further comprise an actuator which is configured to control the flow of the plurality of reagents by modulating the pressure from the single pressure source. The use of a single pressure source is particularly advantageous because it allows for an identical actuation of the plurality of reagents which minimises fluctuations in the relative flow rates. In some embodiments, the actuator used for modulating the pressure from the single pressure source may be a pressure pump. In some embodiments, the actuator may be user controlled.

The reagent containers may be fluid impermeable. This can be particularly advantageous as it provides a barrier between the reagent containers and the rigid housing. Furthermore, if the fluid is a liquid, it may be degassed prior to being introduced into the container and then the fluid impermeable nature of the reagent containers ensures that no gases can contaminate the liquid reagents. Additionally, the fluid impermeable containers may prevent the reagents within the containers to flow into the interior of the rigid housing. It may also prevent the other fluids, such as an actuating fluid, within the rigid housing from entering into the reagent containers.

In some embodiments, the reagent cartridge may further comprise a tube for introducing additional actuating fluid into the housing. The actuating fluid can be liquid or gaseous for example, air, nitrogen or liquid waste from the reagent cartridge.

The rigid housing may be a single housing. Alternatively, the rigid housing may comprise a plurality of pneumatically or hydrostatically connected containers.

In another aspect of the present invention, there is provided a fluidic system comprising a cartridge according to the previous aspect of the invention, the system further comprising a microfluidic device configured to analyse one or more fluids provided from the plurality of reagent containers.

The fluidic system may further comprise a plurality of connecting channels which may contain capillaries configured to transfer fluids from the plurality of reagent containers into the microfluidic device.

In some embodiments, the hydrodynamic resistance of the channel network or capillaries may also contribute to the ratio of the flow rates of the reagents from the containers. In some embodiments, the ratio of resistances provided by the channel network attached to the connection ports may dictate the ratio of flow rates of the reagents. For example, the resistances of the connection ports or the attached channel network may be used to restrict the flow rate of the reagents. In some embodiments the network of hydrodynamic resistances controls the flow rates of each of the reagents simultaneously during operation. In some embodiments the simultaneous control of reagents occurs in the context of steady state operation.

The resistance of the connection port or resistances of channels in series with the ports may be dictated by at least one of the cross sectional area of the port or channel, the length of the port or channel, and the surface roughness of the connection channels. For example, the length may be between 1 mm and 2500 mm and the diameter between 0.001 mm and 10 mm. More particularly, the length may be between 10 mm and 2000 mm and the diameter between 0.005 mm and 5 mm.

The resistance of the connection ports may be substantially equal so that the flow rates of the reagents are substantially equal. In some embodiments, the resistance of the connection ports may differ so that the flow rates of the reagents are different.

In some embodiments, the capillaries can be connected to the connection ports of the reagent containers using valves that open upon connection. The use of valves that open upon connection is to avoid spillage and/or contamination during transport, handling and disposal. In some embodiments these valves are needle free valves, swable valves or Luer-activated valves. Needle free valves can be used to prevent needle-stick injuries, thereby enhancing a user's safety when connecting the channel network to the connection ports. In some embodiments, the channel network may be connected to the connection ports of the reagent containers using quick connect connectors and adapters such as Luer connectors, barbed connectors or push-in connectors. In another embodiment, the channel network may be connected to the connection ports of the reagent containers using threaded connectors.

The fluidic system may further comprise a sump for collecting waste fluid flowing out from the microfluidic device. In some embodiments, the fluidic system may further comprise a drain tube configured to feed waste fluid from the sump into the rigid housing to replace the volume of spent reagents from the reagent containers, thus maintaining the dead volume of the container.

Feeding the waste fluid from the sump into the rigid housing may be beneficial as it allows for compensation of a change in hydrostatic pressure upon the discharge of reagents from the flexible containers. This may be useful for maintaining a constant hydrostatic pressure within the interior of the rigid housing. Furthermore, feeding liquid waste from the sump into the rigid housing may be beneficial as it allows for the flexible containers to be permanently encapsulated in liquid, which further decreases permeability to gases.

Preferably, the microfluidic device is chip based.

Figure 2:
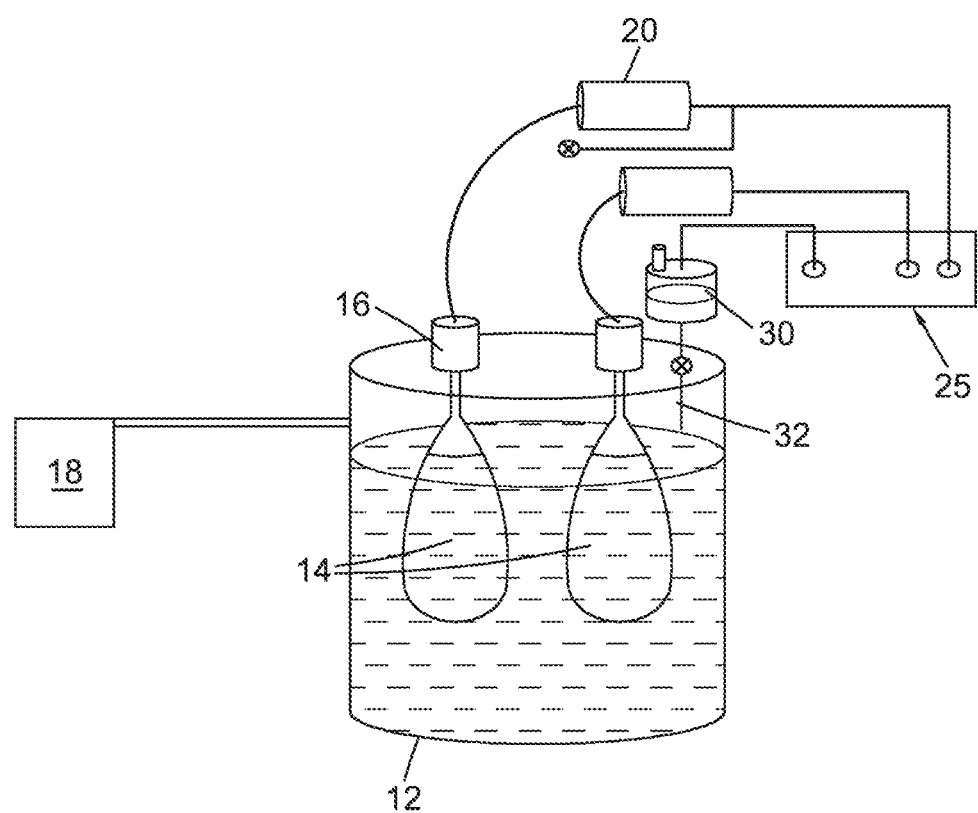

The invention will now be further and more particularly described, by way of example only, and with reference to the accompanying drawings, in which:

FIG. 1 provides an illustration of a reagent cartridge according to the present invention; and FIG. 2 provides a further embodiment of the reagent cartridge.

Referring to FIG. 1 there is provided a reagent cartridge 10 comprising a rigid housing 12, a plurality of flexible reagent containers 14 contained within the rigid housing 12. Each reagent container is configured to hold between 1 ml and 2500 ml of fluid, for example 100 ml. Each reagent container 14 has a connection port 16 through which a reagent can flow upon the application of pressure. The reagent may be a fluid such as a gas or a liquid. As an alternative, the reagent may be a suspension, emulsion or a mixture. The reagent may contain biological or chemical components such as DNA, proteins, carbohydrates and/or organic compounds thereof. The flexible reagent containers may be configured to host the same reagents. Alternatively, the reagent containers may be configured to host different reagents.

The rigid housing may further comprise a tube (not shown) for introducing additional actuating fluid into the interior of the housing. The actuating fluid can be liquid or gaseous for example, air, nitrogen or liquid waste from the reagent cartridge.

By using flexible reagent containers contained within the rigid housing, the reagent containers provide a fluid impermeable barrier. The barrier can be utilised to prevent the reagents mixing with liquids or gases, such as the actuating fluids, within the rigid housing. Additionally, the reagent containers may also provide a means to prevent the reagents entering or leaking out into the interior of the rigid housing. The reagent containers may be made from multilayer plastics. In one embodiment the reagent containers are made from multi-layered plastics with aluminised film or other barrier layers.

A single pressure source 18 is configured to apply pressure to the interior of the rigid housing. The single pressure source is a flexible container 18 as illustrated in FIG. 1. The single pressure source may be a pump 13, in particular a pressure pump or peristaltic pump. An actuator can be provided which is configured to control the flow of the plurality of reagents by modulating the pressure from the single pressure source 18. In some embodiments, the actuator can be user-controlled, for instance with a syringe or an external flexible container in pneumatic or hydraulic connection with the interior of the rigid container.

The pressure generated from the single pressure source may be used for pressurising the actuating fluids contained within the interior of the rigid housing. The pressurised actuating fluids can in turn, compress the plurality of flexible reagent containers. This causes the simultaneous actuation of reagents contained within the plurality of reagent containers. As a result, the reagents may be discharged or flow from the reagent containers into a device such as a microfluidic device 25. This configuration aids the operation of the device in a steady state operation where simultaneous rather than sequential dosing of reagents is required.

As illustrated in FIG. 1, each flexible reagent containers is connected to a connection port 16. The connection ports of the reagents containers further comprises a plurality of connecting channels or capillaries 20. The resistances in the channel network 20 are used to provide a connection between the connection ports of the reagent containers with the microfluidic device. The microfluidic device can be chip based. The channel network 20 may be connected to the connection ports using quick-connection connectors or fittings such as Luer connectors. Alternatively or additionally, the channel network 20 may be connected to the connection ports of the reagent containers using normally closed valves that open upon connection.

The channel network 20 connected to the connection ports 16 is configured to allow the reagents to flow from the reagent containers into the microfluidic device 25. The microfluidic device may be configured to analyse one or more fluids provided from the plurality of reagent containers.

Conversely, the channel network 20 connected to the connection ports 16 may be configured to allow the reagents to be transferred from the microfluidic device into the flexible reagent containers 14.

Each arm of the channel network 20 that is connected to a port of the reagent container may comprise an internal resistance which can be configured to dictate the flow rates of the reagents. The resistances attached to the connection ports are dictated by at least one of the cross sectional area of the port, the length of the port, and the surface roughness of the channel network or the viscosity of the fluid. The resistances of the channel network connected to the ports of the reagent container may be substantially equal so that the flow rates of the reagents are substantially equal. This may provide a continuous flow of reagents between the reagent containers and the microfluidic device. Alternatively, the resistances of the channel network attached to each port may be substantially different so that the flow rates of the reagents are different. In all of the above mentioned embodiments, the use of a single actuation source and the setting of the resistance values, whether matched or divergent, provides a high-precision control of the flow of all of the reagents into the microfluidic device.

Each channel or capillary has a hydrodynamic resistance which can contribute to the flow rates of the reagents. The hydrodynamic resistances of the channels or capillaries are dictated by the geometry of the capillaries such as the cross sectional area of the channel or capillary, the length of the channel or capillary, and the surface roughness of the channel or capillary.

The flow of the reagents between the reagent containers and the microfluidic device can be a laminar flow or it can be a turbulent flow. Furthermore, the flow rates of the reagents can be affected by the viscosity of the reagents.

Additionally, as illustrated in the embodiment shown in FIG. 2, there may be provided a sump 30 for collecting waste fluid flowing out from the microfluidic device 25. The sump 30 may be a hollow or a depressed surface in which the waste fluids are collected. A drain tube 32 connected to the sump 30 can be configured to transport the waste fluids from the sump into the interior of the rigid housing as actuating fluids.

Feeding waste fluids such as liquids into the rigid housing may allow for compensation in a change of hydrostatic pressure upon reagents flowing out of the reagent containers. Therefore, the actuating fluids can provide a constant hydrostatic pressure within the rigid housing, which may help to minimise drift of the flow rates of the reagents. Maintaining the hydrostatic pressure within the housing also aids the high precision control of flows of reagents into the microfluidic device Furthermore, surrounding the flexible containers with liquid may further reduce their permeability to gases. Alternatively, the reagent containers may be permanently immersed in liquid by having a container with a large amount of head room and long, impermeable connectors that attach the reagent containers to the top of the cartridge, or by connecting the reagent containers at the side or bottom of the rigid container.

Moreover, the rigid housing may comprise a plurality of pneumatically or hydrostatically connected containers (not illustrated in the drawings) for storing the reagents. Each pneumatically or hydrostatically connected container may have a connection port. The application of pressure to the pneumatically or hydrostatically connected containers may permit the reagents to flow from the containers into a device such as a microfluidic device. The pneumatically or hydrostatically connected containers can be used as an addition to the flexible reagent containers.

It will further be appreciated by those skilled in the art that although the invention has been described by way of example with reference to several embodiments, it is not limited to the disclosed embodiments and that alternative embodiments could be constructed without departing from the scope of the invention as defined in the appended claims.

The invention claimed is:

1. A fluidic system comprising:
   a rigid housing,
   a plurality of flexible reagent containers contained within the housing;
   wherein each reagent container has a connection port through which a reagent can flow, in use, on the application of pressure;
   a single pressure source configured to apply pressure to the interior of the rigid housing;
   a microfluidic device configured to analyze one or more fluids provided from the plurality of reagent containers; and
   a plurality of channels configured to transfer fluid from the plurality of reagent containers to the microfluidic device;
   wherein the ratio of resistances provided by a combination of the connection ports and the plurality of channels dictates the ratio of flow rates of the reagents; and
   wherein a plurality of reagents contained within the plurality of flexible reagent containers are configured to be actuated simultaneously by the single pressure source.

2. The fluidic system according to claim 1, further comprising an actuator configured to control the flow of the plurality of reagents by modulating the pressure from the single pressure source.

3. The fluidic system according to claim 1, wherein the reagent containers are fluid impermeable.

4. The fluidic system according to claim 1, wherein the resistances of the channel and port network are substantially equal so that the flow rates of the reagents are substantially equal.

5. The fluidic system according to claim 1, wherein the resistances of the channel network differ so that the flow rates of the reagents are different.

6. The fluidic system according to claim 1, wherein the plurality of channels is connected to the connection ports of the reagent containers using normally closed valves that open upon connection, including, but not limited to, needle-free valves, swabable valves, and Luer activated valves.

7. The fluidic system according to claim 1, wherein the plurality of channels is connected to the connection ports of the reagent containers using quick-connection connectors or adaptors, including, but not limited to, Luer connectors, barbed connectors or push-in connectors.

8. The fluidic system according to claim 1, further comprising a sump for collecting waste fluid flowing out from the microfluidic device.

9. The fluidic system according to claim 8, further comprising a drain tube configured to feed waste fluid from the sump into the rigid housing as actuating fluid.

10. The fluidic system according to claim 1, wherein the microfluidic device is chip based.

* * * * *